United States Patent [19]

Cohen et al.

[11] 4,094,999

[45] June 13, 1978

[54] ANTIOXIDANT FOR FOODS

[75] Inventors: Murray S. Cohen, Convent Station, N.J.; Donald E. O'Connell, Marietta, Ohio

[73] Assignee: Borg-Warner Corporation, Chicago, Ill.

[21] Appl. No.: 822,599

[22] Filed: Aug. 8, 1977

[51] Int. Cl.$^2$ .......................... A23D 5/04; A23L 3/00

[52] U.S. Cl. ................................ 426/547; 260/398.5; 426/601

[58] Field of Search .............................. 426/541, 547; 260/927 R, 928, 45.7 P, 45.8 R, 398.5

[56] References Cited

U.S. PATENT DOCUMENTS

| | | | |
|---|---|---|---|
| 2,571,332 | 10/1951 | Brooks | 260/398.5 |
| 3,039,993 | 6/1962 | Friedman | 260/45.8 R |
| 3,205,250 | 9/1965 | Hechenbleikner | 260/927 R |
| 3,523,099 | 8/1970 | Shepard et al. | 426/547 X |
| 3,755,250 | 8/1973 | Wollensak et al. | 426/547 X |
| 3,988,293 | 10/1976 | Mills | 260/45.8 R |

*Primary Examiner*—Raymond N. Jones
*Assistant Examiner*—R. A. Yoncoskie
*Attorney, Agent, or Firm*—Joseph Shekleton

[57] ABSTRACT

A food composition stabilized by the presence therein of a small proportion of a dialkyl pentaerythritol diphosphite. The alkyl groups each contain 10–18 carbon atoms.

4 Claims, No Drawings

ANTIOXIDANT FOR FOODS

This invention relates in general to the stabilization of food compositions. More particularly, it relates to the inhibition of oxidation in food compositions, especially in edible fats and oils.

Oxidation is an important factor in the economy of production and storage of food products. In the case of edible fats and oils, incipient oxidation frequently produces unpleasant flavors, classified as grassy, buttery, beany or fishy. Rancidity is an advanced state of oxidative deterioration. Oxygen from the air first reacts with the unsaturated fatty acid esters at or adjacent to the double bonds to form hydroperoxides which then decompose to yield aldehydes having the pungent odor and flavor of rancid fats. Oxidation is catalyzed by light and metals such as copper or iron and is accelerated by heat.

Such oxidation is avoided, or inhibited, by packaging in brown glass or metal containers; by using an inert gas such as nitrogen in processing and packaging steps; by the use of citric acid during processing so as to inactivate trace metals by chelation; and by the use of antioxidants such as BHA (butylated hydroxyanisole), BHT (butylated hydroxytoluene) and propyl gallate to edible fats and oils deficient in naturally occurring antioxidants.

The invention of this application is the stabilization of food compositions by means of a minor proportion, sufficient to inhibit oxidation thereof, of a dialkyl pentaerythritol diphosphite.

Methods for the synthesis of dialkyl pentaerythritol diphosphites are disclosed in U.S. Pat. No. 3,205,250 (Hechenbleikner). The use of such diphosphites in combination with certain phenolic antioxidants as a stabilizer for olefin polymers is shown in U.S. Pat. No. 3,039,993 (Friedman). The use of distearyl pentaerythritol diphosphite in combination with 2-hydroxy-4-n-octoxybenzophenone as ultraviolet stabilizers in olefin polymers is shown in U.S. Pat. No. 3,988,293 (Mills).

The dialkyl pentaerythritol diphosphites of the invention may be either or both of two isomeric forms, viz., spiro and caged:

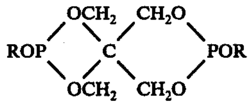

SPIRO

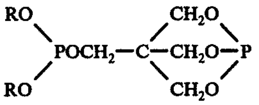

CAGED

R is an alkyl group of 10–18 carbon atoms. Preferably, because of its proven acceptability as a food element, R is octadecyl. The spiro isomer is preferred although the caged isomer also is effective. Generally, because of its ready availability, a mixture of the two isomers is used.

The relative proportion of the above antioxidant to be used will range from about 0.001% to about 0.5% based on the total weight of the stabilized food composition.

All food compositions normally susceptible to deterioration by way of oxidation are benefitted by the stabilizing influence of the antioxidants of the invention and are contemplated within the scope of the invention. Edible fats and oils are the principal foods of this type, including vegetable shortening, lard, corn oil, olive oil and the like. Other food compositions include food snacks, liquid condiments, etc.

The efficacy of the dialkyl pentaerythritol diphosphites as food antioxidants is shown by the data set out in Table I. Samples of corn oil containing varying amounts of distearyl pentaerythritol diphosphite and butylated hydroxytoluene (BHT) are placed in 1-quart mason jars, covered with filter paper, and incubated at 45° C for 3 weeks. Each sample is tested for peroxide content (mg./kg. of sample) initially and at weekly intervals.

TABLE I

| | | ANTIOXIDANT | | | |
|---|---|---|---|---|---|
| TIME | NONE — | BHT 0.002% | BHT 0.01% | A 0.002% | A 0.01% |
| 0 | 0.9 | 1.4 | 1.6 | 1.4 | 0.9 |
| 1 week | 12.7 | 6.1 | 5.4 | 5.7 | 4.7 |
| 2 weeks | 47.2 | 44.9 | 43.8 | 43.8 | 39.0 |
| 3 weeks | 94.2 | 81.7 | 80.4 | 74.6 | 70.6 |
| Odor at 3 weeks | Rancid | Slightly Rancid | None | Very Slightly Rancid | None |

A is the spiro isomer of distearyl pentaerythritol diphosphite, prepared by the reaction at room temperature of dichloro pentaerythritol diphosphite and stearyl alcohol, with triethylamine as an HCl acceptor.

It will be noted that the test samples which contain the distearyl pentaerythritol diphosphite develops a lower concentration of peroxides than the sample which contains no antioxidant, as well as the two samples which contain BHT. Moreover, these test samples (of the invention) develop less rancidity than the others.

The food antioxidant herein is non-toxic. When incorporated into the diet of white albino rates at dietary levels of 300, 1000 and 3000 ppm of body weight per day no abnormalities are seen in body weight gain, food consumption, survival, hematologic studies, clinical blood chemistry, urology, gross and microscopic pathologic studies, and organ weights and ratios.

Preparation of the dialkyl pentaerythritol diphosphites is illustrated by the following examples:

EXAMPLE 1

To a stirred solution of 567 g. (2.1 mols) of octadecyl alcohol and 212 g. (2.1 mols) of triethyl amine in 1800 ml. of toluene, at 30° C, there is added a solution of 265 g. (1.0 mol) of dichloropentaerythritol diphosphite in 600 ml. of toluene; the addition is made portionwise over a period of one hour, then the mixture is warmed with continued stirring at 45°–50° C. The cooled mixture is filtered to separate the triethylamine hydrochloride and the filtrate is stripped of toluene to a final temperature of 85° C/20 mm. The solid residue constitutes a quantitative yield of the spiro isomer of distearyl pentaerythritol diphosphite, M.P., 68°–70° C.

Alternatively, the triethylamine hydrochloride can be separated by adding water to the cooled mixture above, while stirring, and drawing off the toluene fraction.

EXAMPLE 2

A mixture of 368 g. (1.0 mol) of diphenyl pentaerythritol diphosphite, 268 g. (1.0 mol) of octadecyl alcohol and 1.0 g. of sodium methylate is heated at 120°–125° C for 3 hours. The temperature then is raised, at reduced pressure, to 210° C over a period of 1 hour, to remove the phenol which is liberated during the reaction. The residue is an approximately 50-50 mixture of the spiro and caged isomers of distearyl pentaerythritol diphosphite.

All parts and percentages herein are by weight, unless otherwise expressly stated.

We claim:

1. A food composition stabilized by the presence therein of a minor proportion sufficient to inhibit oxidation thereof a dialkyl pentaerythritol diphosphite wherein the alkyl groups each contain 10–18 carbon atoms.

2. The food composition of claim 1 wherein the alkyl groups are octadecyl groups.

3. An edible oil stabilized by the presence therein of a minor proportion sufficient to inhibit oxidation thereof of a dialkyl pentaerythritol diphosphite wherein the alkyl groups each contain 10–18 carbon atoms.

4. The edible oil composition of claim 3 wherein the alkyl groups are octadecyl groups.

* * * * *